Figure 1:
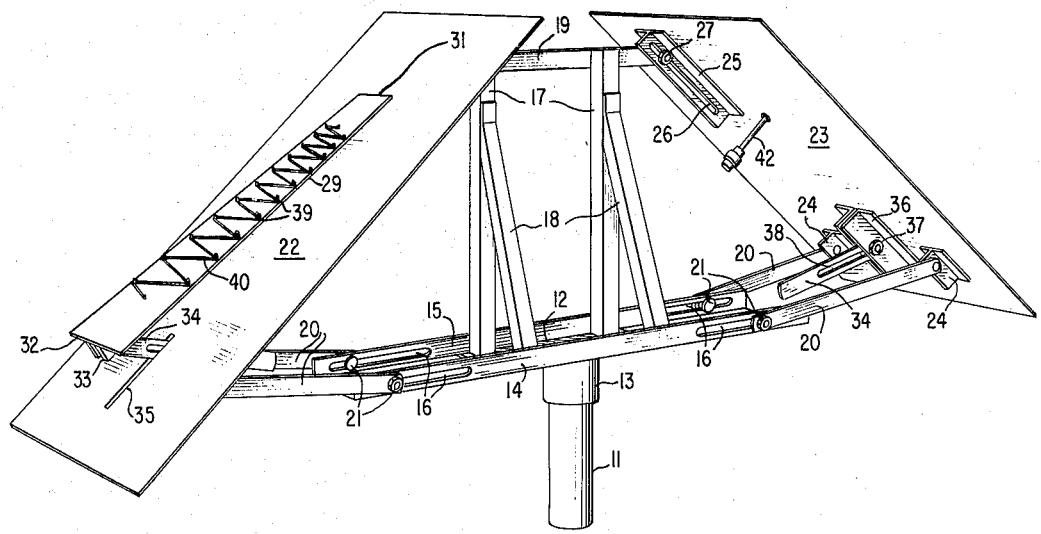

May 3, 1966

E. R. FLANAGAN 3,249,946

FREQUENCY INDEPENDENT ANTENNA ARRAY WITH
CONSTANT PHASE CENTER SPACING

Filed March 25, 1963

INVENTOR.
EDWARD R. FLANAGAN

BY

*Sughrue, Rothwell, Mion and Zinn*

ATTORNEYS

United States Patent Office 3,249,946
Patented May 3, 1966

3,249,946
FREQUENCY INDEPENDENT ANTENNA ARRAY WITH CONSTANT PHASE CENTER SPACING
Edward R. Flanagan, Monkton, Md., assignor to Martin Marietta Corporation, New York, N.Y., a corporation of Maryland
Filed Mar. 25, 1963, Ser. No. 267,637
4 Claims. (Cl. 343—758)

This invention relates in general to a twin antenna array for both the transmission and reception of radiant electrical wave energy and more particularly to such an antenna array that is capable of operating over a wide range of frequencies and in which the shifting phase centers of the two antennas are inherently maintained at a constant electrical distance or spacing with respect to each other. This antenna array is further characterized by two elliptical main lobe beam patterns whose center axes are parallel to each other, thus rendering the array especially, although by no means exclusively, useful in direction finding applications.

Frequency independent antennas have been known and used in the prior art in connection with various types of electronic transmitting and receiving equipment, including radar devices, radio and short wave sets, and navigating systems, and possess the distinct advantage of great flexibility by reason of their ability to function efficiently over a wide range of operating frequencies with little or no signal attenuation. Since the operating frequency of any given antenna or antenna section is primarily determined by the physical dimensions of and between the conducting members of the antenna, most of the frequency independent antennas of the prior art have taken the form of a continuous, reciprocating conducting member wherein each successive side or section is progressively smaller such as a tapering, triangular saw-toothed configuration. With this type of antenna, the frequency range is determined by the side dimensions of the smallest and largest teeth, the wave-length limits at each end of the bandwidth being approximately twice the length of the smallest and largest teeth sides, respectively. Such a frequency independent antenna is further characterized by the fact that the position of its phase center is a function of frequency and the phase center moves along the entire length of the antenna as the frequency goes from one extreme to another, i.e., from its highest to its lowest limit.

One of the many practical applications for frequency independent antennas is in precision wide band direction finding systems. In such systems, which are used to determine the direction from which a source of electromagnetic energy is emanating, one of the more common techniques employed is that of phase comparison. In a system employing the phase comparison technique, two such antennas are aligned with the axes of their main lobe beam patterns parallel to each other, and the direction of the received signal is determined by measuring the phase difference between the signals being received by each antenna. The phase difference $\phi$ between the two signals is given by the expression $$\phi = 2\pi \frac{d}{\lambda} \sin \theta$$

where $d$ is the separation between the phase centers of the two antennas, $\lambda$ is the wavelength of the received signal, and $\theta$ is the angle between the antenna beam axes and the direction of the received signal. It can be seen from the above expression for the phase difference that any change in the signal wavelength causes a phase change because of the term $$\frac{d}{\lambda}$$

In the prior art phase comparison direction finding systems it has been necessary to correct the phase information for wavelength changes in the received signal due to the shifting phase center phenomenon described above. This has required the use of complex and extensive electronic correction networks, which is a distinct disadvantage in that the overall system is thereby rendered more costly, more cumbersome, and more susceptible to error, such as may be caused by ambient temperature changes, power source variations, etc.

In the constant phase center spacing antenna array of this invention, the term $$\frac{d}{\lambda}$$

in the above expression is held constant by reason of the fact that the physical distance between the antenna phase centers $d$ is inherently varied in the same proportion as the signal wavelength $\lambda$. By holding the term $$\frac{d}{\lambda}$$

constant, this invention obviates the necessity of correcting the phase information in order to find the direction of the received signal, and providing that the frequency of the signal is within the bandwidth of the antennas, its direction can be found without regard to its wavelength.

It is accordingly an object of this invention to provide a novel twin antenna array capable of functioning efficiently over a wide range of operating frequencies and which effectively overcomes the above-described disadvantages attendant with the prior art antenna arrays.

It is a further object of this invention to provide such a twin antenna array wherein the conducting members are in the form of continuous, reciprocating elements arranged in a tapering, toothed configuration in which the operating frequency range is determined by the side dimensions of the smallest and largest teeth and in which the center axes of the main lobe beam patterns of each antenna are substantially parallel.

It is a further object of this invention to provide such a twin antenna array in which the phase centers of the two antennas are inherently maintained at a constant electrical distance or spacing with respect to each other over the entire operating frequency range.

It is a further object of this invention to provide such a twin antenna array which is particularly suitable for use with a phase comparison type of wide band direction finding system and which, when so employed, obviates the need for any complex and extensive electronic correction networks to compensate for the changing phase center spacing characteristic of the conventional antenna array.

Figure 2:
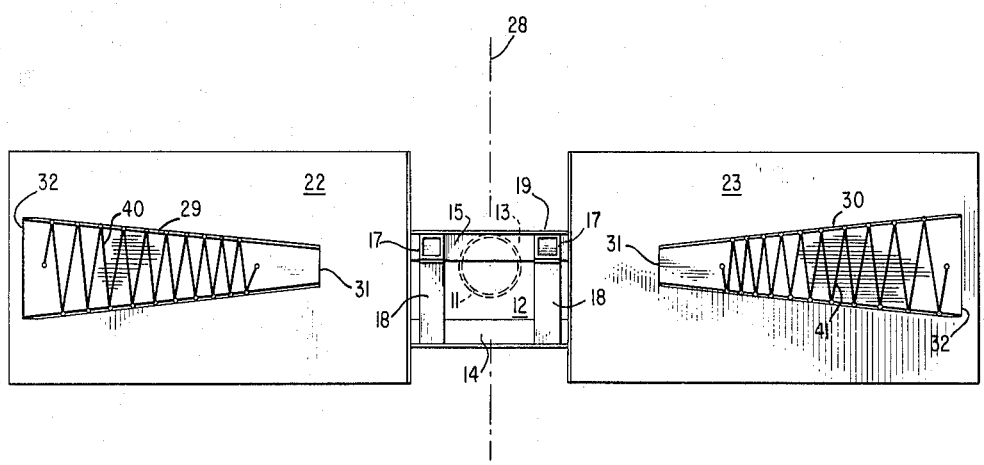

These and other objects of this invention will be readily apparent to those skilled in the art from a consideration of the following description taken in conjunction with the drawings, in which:

FIGURE 1 is a side perspective view of a preferred embodiment of the twin antenna array contemplated by this invention; and, FIGURE 2 is a top elevational view thereof.

Referring now to the drawings, wherein the same reference numerals are used in both figures to designate like elements, there is provided a tubular supporting member 11 over which a base plate 12 is positioned by means of a flange cap 13.

These and the various other rigidly attached structural members of the antenna array construction may be mechanically joined by means of welding, bolting, etc., such connections not being critical to the present invention. Two transverse angle beams 14 and 15, having longitudinal slots 16 in the ends of their vertical faces, are mounted in a parallel fashion on opposite sides of the base plate 12. A pair of upright square beams 17 are rigidly attached to the transverse beam 15, and a corresponding pair of angle beam brace members 18 are attached between the upright beams 17 and the transverse beam 14 to increase the overall rigidity of the structure. A cross beam 19 is mounted to and extends across the tops of the upright beams 17. Four adjustable extension arms 20 are slidably attached to the transverse beams 14 and 15 by means of clamping bolts 21 which extend through the longitudinal slots 16 in the ends of the transverse beams. Two substantially flat ground planes 22 and 23, which may be formed from thin rectangular sheets of conductive material such as aluminum, copper, etc., are mounted to the extension arms 20 and the cross beam 19 by means of the pivoted brackets 24 and the adjustable bracket 25, respectively, the latter elements containing longitudinal slots 26 in their projecting faces which cooperate with clamping bolts 27 which extend therethrough from the ends of the cross beam 19. It will be understood that although only the underside mounting structure of ground plane 23 is shown in the drawings, the hidden underside of ground plane 22 is provided with identical mounting structure. The antenna array construction described thus far is of the image type in the sense that a mirror plane bisecting the tubular supporting member 11 along line 28 of FIGURE 2 would reflect identical images on either side. With such a construction the ground planes 22 and 23, if extended at their converging ends, would intersect along a line which would fall on the surface of the bisecting mirror plane.

Two triangular dielectric antenna conductor supports 29 and 30 are positioned at equal angles of inclination to the ground planes 22 and 23, respectively, with their vertex ends 31 resting directly on the ground planes and their base ends 32 adjustably mounted by means of brackets 33 to which positioning arms 34 are pivotally attached. The arms 34 extend through ground plane slots 35 and are slidably mounted within channel brackets 36 by means of clamping bolts 37 which extend through longitudinal slots 38. It is to be understood that the various structural connections shown in this preferred embodiment as being of an adjustable or pivotal nature were made so only for reasons of laboratory expediency. Once the critical linear and angular dimensional parameters of the antenna array are properly chosen, as described below, and various structural adjustments are made in accordance therewith, these connections may take any rigid, convenient form, and would indeed do so if being manufactured in any quantity. The antenna conductor supports 29 and 30 may be formed from any suitable dielectric material, such as Fiberglas sheets, for example, and have alternately mounted thereto along opposite sides a plurality of upstanding anchor pins or posts 39 formed from the same or a similar dielectric material.

A pair of conductive antenna wires 40 and 41 are wound back and forth between the anchor pins 39 as shown, resulting in two similar reciprocating conducting elements arranged in a tapering, toothed configuration. While a triangular saw-toothed pattern has been shown in this preferred embodiment, it is to be understood that a square-toothed pattern, as well as several others well known in the art, may be used if desired, and the same design characteristics for the mounting and supporting structure would be universally applicable. It is also to be understood that the conducting elements are not restricted to a wire construction, but may also be formed by suitably joining a number of properly dimensioned rods or bars or by bending continuous lengths of bar stock. The antenna may also be fabricated using printed circuit techniques. The dimensions chosen for the conducting elements will depend upon the range of operating frequencies it is desired to encompass. This range could theoretically be almost infinite, since the lower frequency limit is determined only by the side dimension of the largest tooth in each conducting element, and the upper frequency limit is similarly determined only by the corresponding dimension of the smallest tooth. The lower end of each antenna wire terminates in a fixed connection to the conductor support, while the upper end of each antenna wire extends through a hole in the center of the conductor support to a feed cable 42. Each antenna wire is connected to a separate feed cable. When so arranged, each of the separate feed cables 42 will advantageously have equal lengths between the antenna wires and the connection to a common cable, so as to obviate any unbalanced phase distortion due to the line characteristics. It will be noted from FIGURE 2 that in this preferred embodiment, the two antenna wire patterns are non-image, i.e., the wires are wound around the anchor pins in opposite directions. This limitation is not critical, although the degree of definity presented by the lobe patterns of the resulting parallel beams is usually somewhat enhanced thereby.

In constructing such a twin antenna array, the maintaining of a constant phase center spacing over the entire operating frequency range, which is an essential aspect of this invention, may be achieved in the following manner. The physical separation between the sides of the smallest teeth at the high-frequency ends of each conductive antenna wire is chosen to represent a predetermined number of wave lengths of the highest frequency signal that may be accommodated by the antennas, which in turn may be readily determined from the dimensions of the sides of the smallest teeth. This separation distance, or electrical spacing, may conveniently be chosen as an integral multiple of the high frequency wave length, although this is not essential. Once this electrical distance is established for the high frequency limit, it is a simple matter to calculate the physical separation between the sides of the largest teeth at the low frequency ends of the antenna wires necessary to maintain the same electrical distance or spacing. The relationships involved are all linear, and thus if the high frequency limit is twice the low frequency limit, the physical separation between the low frequency ends of the antenna wires must be twice that which exists between the high frequency ends in order to maintain the same or constant electrical spacing for all equal frequency points of the two antenna wires. Having established the physical separation between opposite ends of the antenna wires necessary to maintain a constant electrical spacing, it only remains to adjust the angles of inclination between the conductor supports 29 and 30 and their respective ground planes 22 and 23 so that the center axes of the main lobes of the beam patterns for each of the antennas will be substantially parallel. It is, of course, essential that these angles of inclination be equal.

With a twin frequency independent antenna array constructed in this fashion, the electrical spacing or distance between the phase centers of each antenna half will inherently be maintained at a constant value regardless of the operating frequency, thus enabling the elimination of the complex electronic correction networks conventionally needed to compensate for this shifting phase center phenomena in systems employing antennas with a fixed separation between their phase centers.

While there has been described and shown herein only a single preferred embodiment of the present invention, it will be understood that this embodiment is exemplary only, and many minor variations and changes therein which will be readily apparent to those skilled in the art may be made without departing from the spirit and scope of the invention. For example, the concept of constant phase center spacing may easily be employed with any type of frequency independent antenna array and is not limited in application to those of the zig-zag type as shown herein. In addition, this concept and the principles used in the implementation thereof is not restricted to twin antenna arrays, but has equal application to antenna arrays employing any number of separate sections in excess of two.

What is claimed is:
1. A twin antenna array for the transmission or reception of radiant electrical wave energy comprising: a sup- port member, two ground plane members mounted on the support member at a converging angle, two physically separated triangular shaped antennas mounted at equal angles of inclination on the ground plane members, respectively, in such a manner that the extended center axes of the antennas intersect at a plane which bisects the converging angle between the ground plane members, the antennas including substantially similar reciprocating conducting members having tapering toothed configurations that are effectively operable over a wide frequency range determined by the dimensions of the smallest and largest teeth and whose phase centers shift over the length of the conducting members with changes in operating frequency, and wherein the angles of inclination between the two antennas and their respective ground plane members and the converging angle between the two ground plane members are such that the antenna array has two parallel beam patterns and the electrical spacing between the phase centers of the two antennas is always constant over the entire operating frequency range.

2. A twin antenna array as defined in claim 1 wherein each of the antennas is connected to a separate transmission line.

3. A twin antenna array as defined in claim 1 wherein the tapering toothed configuration of the conducting members is arranged in a triangular saw-toothed pattern in which each successive side is progressively smaller approaching the vertex.

4. A twin antenna array as defined in claim 1 wherein the ground plane members are adjustably mounted on the support member.

References Cited by the Examiner
UNITED STATES PATENTS

| | | | |
|---|---|---|---|
| 2,977,597 | 3/1961 | Du Hamel et al. | 343—792.5 |
| 2,989,749 | 6/1961 | Du Hamel et al. | 343—792.5 |
| 3,059,234 | 10/1962 | Du Hamel et al. | 343—792.5 |
| 3,127,611 | 3/1964 | Du Hamel et al. | 343—792.5 |

OTHER REFERENCES

Du Hamel et al.: Log. Periodic Antenna, IRE National Convention Record, Part I, March 1958, pages 139–151.

Some Variations in Log-Periodic Antenna Structure, J. W. Carr, IRE Transaction on Antennas and Propagation AP 9, 1961, pages 229, 230.

ELI LIEBERMAN, *Acting Primary Examiner.*

HERMAN KARL SAALBACH, *Examiner.*

P. GENSLER, W. TAYLOR *Assistant Examiners.*